United States Patent [19]
Lynn

[11] Patent Number: 5,633,217
[45] Date of Patent: May 27, 1997

[54] METHOD OF MAKING A HIGH STRENGTH CATALYST, CATALYST SUPPORT OR ADSORBER

[75] Inventor: Merrill Lynn, Big Flats, N.Y.

[73] Assignee: Corning Incorporated, Corning, N.Y.

[21] Appl. No.: 486,477

[22] Filed: Jun. 7, 1995

Related U.S. Application Data

[63] Continuation-in-part of Ser. No. 304,157, Sep. 12, 1994, abandoned.

[51] Int. Cl.$^6$ .............. B01J 21/04; B01J 20/00; B01J 29/00
[52] U.S. Cl. .............. 502/439; 502/407; 502/415; 502/62; 502/64; 502/159; 502/242; 502/263; 502/349
[58] Field of Search .............. 502/439, 407, 502/125, 64, 62, 159, 242, 263, 349, 415

[56] References Cited

U.S. PATENT DOCUMENTS

| | | | |
|---|---|---|---|
| 4,657,880 | 4/1987 | Lachman et al. | 502/64 |
| 4,831,267 | 5/1989 | Brunner | 250/397 |
| 5,520,895 | 5/1996 | Sharma et al. | 423/239 |

FOREIGN PATENT DOCUMENTS

| | | |
|---|---|---|
| 1199483 | 7/1970 | United Kingdom . |

*Primary Examiner*—Glenn A. Caldarola
*Assistant Examiner*—Thuan D. Dang
*Attorney, Agent, or Firm*—L. Rita Quatrini

[57] ABSTRACT

A method of making a catalyst, catalyst support or adsorbing structure which involves forming a mixture of raw material which can be ceramic and/or molecular sieve, silicone resin permanent binder, dibasic ester as a solvent for the silicone resin, organic binder of cellulose ether, and/or derivatives thereof, and water, shaping the mixture into a green body which is then dried and heated to develop strength and form the catalyst, catalyst support, or adsorber.

11 Claims, No Drawings

METHOD OF MAKING A HIGH STRENGTH CATALYST, CATALYST SUPPORT OR ADSORBER

This application is a continuation-in-part of application Ser. No. 08/304,157 which was filed on Sep. 12, 1994, now abandoned.

This invention relates to a method of making a catalyst, a catalyst support, or adsorbing structure of ceramic and or molecular sieve, in which a dibasic ester, is used as the solvent for silicone resin permanent binder precursor. The new solvent system effectively replaces prior flammable solvents in the process and makes the manufacturing process safer.

BACKGROUND OF THE INVENTION

Zeolites, including zeolites in the form of shaped or extruded structures such as honeycombs can function in a number of workstream-modifying applications. For example, they can function as Denox catalysts, or be used as adsorbers for example, for hydrocarbons.

Extruded zeolite honeycombs are used as catalysts such as for the selective reduction of $NO_x$. U.S. Pat. No. 4,831,267 describes a method for extruding a zeolite honeycomb catalyst for Denox applications. In the method described in U.S. Pat. No. 4,831,267, silicone resin is used as a permanent binder precursor since it imparts very good strength and long life to the honeycomb. Silicone resins that convert to reactive silica are most advantageous as far as enhancing strength in the honeycomb. This type of silicone resin must be dissolved in a solvent to achieve the desired strength.

U.S. Pat. No. 4,831,267 discloses organic solvents for silicone resins such as alcohols e.g. isopropyl alcohol which is flammable.

A suitable solvent for the silicone resin which is not flammable and which is cost effective, would therefore be desirable.

The present invention sets forth a method of making a porous structure which can be a catalyst, catalyst support, or adsorbing structure, which makes use of silicone resin as an inorganic binder precursor dissolved in a suitable non-flammable solvent which is cost-effective.

SUMMARY OF THE INVENTION

In accordance with one aspect of the invention there is provided a method of making a catalyst, catalyst support, or adsorbing structure which involves forming a mixture of raw material which can be ceramic and/or molecular sieve, silicone resin permanent binder, dibasic ester as a solvent for the silicone resin, organic binder of cellulose ethers, and/or derivatives thereof, and water, shaping the mixture into a green body which is then dried and heated to develop strength and form the catalyst, catalyst support, or adsorber.

DETAILED DESCRIPTION OF THE INVENTION

According to the present invention, a method is provided to form a structure which can be a catalyst, catalyst support, or adsorber in which a high surface area material which can be ceramic and/or molecular sieve is bound into a strong cohesive mass by permanent binders which are uniformly mixed into the support structure itself. The raw material, permanent binders which include precursors for the permanent binders, and temporary binder are mixed into a substantially homogeneous body, which can be of any desired shape, and then heat-treated to form the product. The permanent binder component always includes silicone resin as a precursor for the permanent binder silica. The solvent for the silicone resin is dibasic ester.

The specific non-flammable solvents according to the present invention replace the flammable alcohols, especially isopropyl alcohol and diacetone alcohol. The dibasic ester solvents of the present invention have flash points above about 94° C. (200° F.).

In addition to their non-flammability, the dibasic ester solvents have the advantage of high solvency for the resin in the presence of water. The high solvency enables the resin to convert effectively to silica as an inorganic binder in the product support, which silica binder imparts high temperature strength to the support.

The Raw Material

Suitable raw materials, most typically porous oxides, are those which, after calcining, have a surface area of at least about 20 $m^2/g$, and preferably at least about 100 $m^2/g$. (As used herein, calcining means heat-treating a material to a temperature sufficiently high to substantially eliminate any volatiles but below that at which the material begins to lose substantial porosity.)

The raw material can be ceramic and/or molecular sieve materials which are commonly known in the art.

Preferably the raw material is alumina, silica, spinel, titania, zirconia, or zeolite or combinations of these. The invention is not limited to these particular oxides, however, and as those skilled in the art will recognize, the invention contemplates the use of other materials which are commonly used as catalysts, catalyst supports, or adsorbers, and which have the above-described characteristics.

The aluminas which are useful in the preparation of the high surface area supports are those which, upon calcining, provide gamma-alumina or other transition aluminas having the specific surface area. Colloidal gamma alumina can be used directly, or materials which generate a transition alumina upon calcining, such as alpha alumina monohydrate or alumina trihydrate can also be used. When alpha alumina monohydrate or alumina trihydrate is used, the average particle size can be from less than 1 micrometer up to about 100 micrometers in diameter. Suitable commercially available materials of this kind are gamma alumina from Vista Chemical and the Catapal® aluminas available from the chemical division of Conoco Corporation. The colloidal gamma-alumina is generally in the form of particles not exceeding about 1 micrometer in diameter.

Spinels useful in the present invention are the magnesium aluminate spinel heretofore used as catalyst supports, including spinel solid solutions in which magnesium is partially replaced by such other metals as manganese, cobalt, zirconium, or zinc. Preferred spinels are magnesium aluminate spinels having about 1–7% by weight alumina in excess of 1:1 $MgO.Al_2O_3$ spinel, that is, those having about 72.0–73.5 weight percent $Al_2O_3$ (balance MgO).

High surface area silicas that can be used are the amorphous silicas of about 1–10 micrometers or sub-micron particle size such as Cabosil® EH-5 colloidal silica, available from Cabot corporation colloidal silica derived from gels.

Composites of alumina and silica which are commercially available can also be used as the raw material. Alternately alumina and silica can be mixed directly in the preparation of the structure.

The preferred raw material in the practice of the present invention is zeolite. Some types of zeolites that are suitable are pentasil, faujasite, mordenite, beta, and combinations thereof. The pentasil zeolites are preferred and ZSM-5 is especially preferred, in particular for Denox applications. The silica to alumina mole ratio should be high for high temperature stability. For example, for ZSM-5, the silica to alumina mole ratios is at least about 25, and preferably at least about 55. One source of ZSM-5 zeolite is supplied by Mobil Corporation under the designation MZ-12.

The Silicone Resin

The silicone resin can be any one or combinations of silicone resins available commercially today. The preferred resins are crosslinkable silicones containing reactive silanol groups. Examples of suitable silicone resins are phenyl methyl polysiloxanes. Especially suitable silicone resins are available from Dow Corning under the designations 805, 806A, and 6-2230. Most preferred is supplied by Dow Corning under the designation 6-2230 because of its high reactivity.

Solvents for the Silicone Resin

The solvent for the silicone resin is dibasic ester. Especially suited are dimethyl succinate, dimethyl adipate, dimethyl glutarate and combinations of these. One especially suited dibasic ester component is a mixture of dimethyl esters of adipic, glutaric, and succinic acids available from Dupont under the name of DBE.

Temporary Binders

Temporary binders are so called because they are removed during heat-treating. The temporary binders are plasticizing organic binder with optional additions of a co-binder.

The Organic Binder

The purpose of the organic binder is to provide plasticity and some green strength after drying. Organic binder according to the present invention refers to cellulose ether type binders. Some typical organic binders according to the present invention are methylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. Methylcellulose and/ or methylcellulose derivatives are typically used in the practice of the present invention. Methylcellulose, hydroxypropyl methylcellulose, and combinations thereof are especially preferred. Preferred sources of cellulose ethers are Methocel® A4M, F4M, and F240M from Dow Chemical Co. Methocel® A4M is a methylcellulose binder having a gel temperature of 50°–55° C., and a gel strength of 5000 g/cm$^2$ (based on a 2% solution at 65° C.). Methocel® F4M and F240M are hydroxypropyl methylcellulose.

The Co-binder

The co-binder enhances the plasticity of the mixture. Some examples of suitable co-binders are water soluble binders. Polyvinyl alcohol (PVA), or polyvinyl acetate are especially suitable.

A homogeneous formable mixture is made of the raw material, permanent binder and/or permanent binder precursors, temporary binder, and vehicle. Although any vehicle can be used that is safe, feasible and does not adversely affect the mixture, the preferred vehicle in extrusion processing is water.

Although the invention is not limited to any specific composition, some especially suited mixture compositions by weight are about 65% to 95% zeolite, e.g., ZSM-5 zeolite, and about 5% to 35% silicone resin with super additions (i.e., based on the zeolite and silicone resin) of about 1% to 10%, and preferably about 3% to 6% organic binder, e.g. methylcellulose and/or hydroxypropyl methylcellulose, preferably about 1 to 2% co-binder, e.g., polyvinyl alcohol. Preferably the silicone resin is dissolved in sufficient dibasic ester solvent to solubilize the entire charge of silicone resin. This is usually about 20 weight parts of silicone resin in about 15 weight parts of dibasic ester although this can vary.

The mixture components are combined to form a homogeneous or substantially homogeneous mixture. Normally the dry ingredients are first dry blended, preferably in an intensive mixer, and then combined with the wet ingredients (i.e. binder precursors in suspensions or solutions, vehicle, solvents, etc.). Usually, the silicone resin dissolved in the dibasic ester is added to the dry blend followed by addition of the vehicle. It is critical that the raw material be well mixed into a plasticized batch with the silicone resin. Conventional mixing equipment, e.g. mix-muller or high shear mixer can be used. To effect further mixing, the batch can be first extruded through a "noodling" die one or more times.

The mixture is formed into the desired shape. The preferred shaping is done preferably by extrusion through a die in a ram, single screw, or twin screw extruder. When a twin screw extruder is used, it is not necessary to pre-mix the batch by extruding through a noodling die.

The body can take any shape suitable for a catalyst, for supporting a catalyst such as a catalyst metal, or for adsorbing. The shape depends on the application. Some typical shapes can be, for example, pellets, tubes, or honeycombs, etc.

The method of this invention is particularly well suited to the preparation of structures in the shape of honeycombs. Some examples of honeycombs produced by the process of the present invention, although it is to be understood that the invention is not limited to these, are about 94 cells/cm$^2$ (600 cells/in$^2$), about 62 cells/cm$^2$ (400 cells/in$^2$), or about 47 cells/cm$^2$ (300 cells/in$^2$), about 31 cells/cm$^2$ (200 cells/in$^2$), or about 15 cells/cm$^2$ (100 cells/in$^2$), or about 1.4 cells/cm$^2$ (9 cells/in$^2$). Typical wall (web) thicknesses in catalytic conversion applications, for example, are about 6 mils (about 0.15 mm) for 400 cells/in$^2$ (62 cells/cm$^2$) honeycombs. Web thicknesses range typically from about 4 to about 35 mils (about 0.1 to about 0.9 mm). The external size and shape of the body is controlled by the application.

The resulting shaped green bodies are dried first to remove the vehicle. This can be done by steam or controlled humidity drying, dielectric drying of combinations of these techniques.

For example, one especially suited drying technique is use of a dielectric dryer at low power or short drying times, followed by conventional oven or air drying. Dielectric drying is known in the art. Those skilled in the art can adjust the dielectric dryer in known ways to obtain low power drying, such as adjusting plate height, adjusting RF voltage, or adjusting drying time. One advantage of the dibasic ester solvent is that it is not removed in dielectric drying as is isopropyl alcohol and does not require explosion-proof dryers.

The dried bodies are heated (fired) at a temperature of about 400° C. to 1000° C. to develop strength. The heating temperatures depend on the particular support material. For example, for a zeolite the temperatures are most advantageously about 700° C. to 900° C. The heating times depend on factors such as the type of material, temperature, size and shape of the body, etc.

In general, the structures of the present invention can be used in workstream modifying applications which are known in the art, and it is to be understood that the invention is not limited to any specific use of these structures. They can be used as catalysts, as catalyst supports, or as adsorbers. They can be contacted with catalyst material such as catalyst metal or oxides, in which case they are said to be catalyst supports. Zeolites can be used with or without catalyst metals or metal oxides. Zeolites with or without a catalyst metal can be used as adsorbers for various species such as hydrocarbons, etc.

One especially suited catalytic application for zeolite structures of the present invention is Denox or conversion of $NO_x$ to innocuous products, such as e.g., selective catalytic reduction (SCR) of $NO_x$ by ammonia. The high temperature strength of the zeolite which is enhanced by the silicone resin binder is an excellent choice for the high temperature environments experienced in some applications such as $NO_x$ removal from effluent from stationary power plants. As such, the zeolite structure can be used to support additional catalyst metals to enhance its properties.

To more fully illustrate the invention, the following non-limiting examples are presented. All parts, portions, and percentages are on a weight basis unless otherwise stated.

EXAMPLE 1

(Comparative)

A mixture was prepared for extrusion by blending about 100 parts of ZSM-5 zeolite, 5.4 parts of Methocel F240 binder, and 67.2% water, charging the mixture to a Brabender mixer with roller blades at about 30 rpm for about 5 minutes, and transferring the resulting plasticized mixture to an extruder where the mixture was de-aired, then extruded to 6.4 mm (¼") diameter rods. The rods were dried overnight in an oven, then fired at about 850° C. for about 4 hours. The rods were tested for strength by measuring the four point mean modulus of rupture (MOR) which was less than about 50 psi. This example shows that products made from zeolite mixtures without silicone resin are low in strength.

EXAMPLE 2

(Comparative)

A mixture composed of about 80.6 parts of ZSM-5 zeolite, 19.4 parts Dow Corning 6-2230 silicone resin, 5.4 parts Methocel F240 binder and 54.1 parts water was plasticized, extruded, dried, fired, and tested for strength as described above. The resulting mean MOR was less than about 100 psi.

This example shows that products made from zeolite mixtures with silicone resin and no solvent are low in strength.

EXAMPLE 3

(Comparative)

A mixture composed of about 78.2 parts ZSM-5 zeolite, 21.8 parts 6-2230 silicone resin, 6 parts Methocel F240 binder, 16.7 parts of a high flash point hydrocarbon mixture supplied by Ashland Chemical under the name of HiSol 15 as solvent for the silicone resin, and 41.7 parts water was plasticized, extruded, dried, fired and tested as described above. The resulting four point mean MOR was about 723 psi.

EXAMPLE 4

(Comparative)

A mixture composed of about 78.2 parts ZSM-5 zeolite, 21.8 parts 6-2230 silicone resin, 6 parts Methocel F240 binder, 16.7 parts of a hydrocarbon mixture supplied by Ashland Chemical under the name of Exxate as solvent for the silicone resin, and 41.7 parts water was plasticized, extruded, dried, fired and tested as described above. The resulting four point mean MOR was about 1120 psi.

EXAMPLE 5

(Inventive)

A mixture composed of about 78.2 parts of ZSM-5 zeolite, 21.8 parts 6-2230 silicone resin, 6 parts Methocel® F240 binder, 12.5 parts dibasic ester DBE from Dupont, and 45.9 parts water was plasticized, extruded, dried, fired, and tested as described above. The resulting mean MOR was about 1440 psi.

EXAMPLE 6

(Inventive)

A mixture composed of 80 parts ZSM-5 zeolite, 20 parts 6-2230 silicone resin, 3.6 parts Methocel® A4M binder, 1.8 parts Airvol 540S polyvinyl alcohol binder, 15 parts dibasic ester DBE, and 35 parts water was mixed for 25 minutes in a mix-muller. The plasticized mixture was de-aired by extruding through a noodling die in a ram extruder. Some of the noodles were then extruded into 6.4 mm (¼") diameter rods, dried, fired, and tested as described above. The resulting mean MOR was about 1570 psi.

The above examples show that the strength of zeolite products is higher when silicone resin is used with dibasic ester as the solvent.

EXAMPLE 7

(Inventive)

The remainder of the plasticized noodles in Example 6 were extruded through a cellular die in a ram extruder to produce honeycombs measuring about 12.6 cm long by about 12.6 cm in diameter (5"×5") with about 3.9 cells/cm$^2$ (25 cells/in$^2$) and 0.9 mm (35 mil) thick webs or walls. The honeycomb substrates were dried by heating in a dielectric dryer for about 45–60 seconds to solidify the Methocel binder, followed by drying overnight at about 105° C. in a conventional oven. Products of varying lengths were fired at temperatures ranging from about 600° C. to about 850° C. The resulting products had excellent activity for $NO_x$ conversion in the presence of ammonia in the 400° C. to 600° C. range.

EXAMPLE 8

(Inventive)

A mixture was prepared by charging about 80 parts of ZSM-5 zeolite, 20 parts of 6-2230 silicone resin which was screened to about −60 mesh, 3.6 parts Methocel A4M binder, and 1.8 parts Airvol 540S polyvinyl alcohol to a Littleford mixer and dry blending for about 4 minutes. About 15 parts of DBE were added followed by mixing for another 2 minutes. About thirty-five parts of water were added to the Littleford and the mixture was blended for two more minutes. This mixture was extruded through a 3.9 cells/cm² (25 cell/in²) cellular die in a 34 mm twin screw mixer. The 5.1 cm (2") diameter honeycomb products were dried in a dielectric oven for about 60 seconds, followed by overnight drying in a conventional oven at about 105° C. The honeycombs were fired at about 850° C. The zeolite honeycombs had excellent $NO_x$ conversion in the presence of ammonia in the 400°–600° C. range.

EXAMPLE 9

(Inventive)

A mixture was prepared by charging about 80 parts of ZSM-5 zeolite, 3.6 parts of Methocel A4M binder, and 1.8 parts Airvol 540S polyvinyl alcohol to a Littleford mixer and dry blending for about 3 minutes. To the dry blend, a solution containing about 20 parts 6-2230 silicone resin dissolved in about 15 parts dibasic ester DBE was added and mixing was continued for about 3 more minutes. Thirty-three parts of water were added and wet mixing was continued for an additional 4 minutes. This mixture was extruded through a 5.4 cells/cm² (35 cell/in²) cellular die in a 90 mm diameter (diameter of a barrel of a single screw element) twin screw mixer. The resulting 13.2 cm (5.91") square honeycombs were dried in a large production dielectric dryer at very low power (plate height of about 15" and 10 KV), followed by conventional drying. The large honeycombs were fired at about 850° C.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method of making a catalyst, catalyst support, or adsorber, the method comprising:

a) forming a mixture of raw material selected from the group consisting of ceramic, molecular sieve, and combinations thereof, permanent binder comprising silicone resin, dibasic ester as a solvent for the silicone resin, temporary binder comprising an organic binder selected from the group consisting of cellulose ethers, cellulose ether derivatives, and combinations thereof, and water;

b) shaping the mixture into a green body;

c) drying the green body; and d) heating the green body to develop strength in the body and form a catalyst, a catalyst support, or an adsorber.

2. A method of claim 1 wherein the support raw material is selected from the group consisting of zeolite, silica, alumina, spinel, titania, zirconia, and mixtures thereof.

3. A method of claim 2 wherein the support raw material is zeolite.

4. A method of claim 3 wherein the zeolite is selected from the group consisting of pentasil, faujasite, mordenite, beta, and combinations thereof.

5. A method of claim 4 wherein the zeolite is a pentasil zeolite.

6. A method of claim 5 wherein the zeolite is ZSM-5 zeolite.

7. A method of claim 1 wherein the dibasic ester is selected from the group consisting of dimethyl succinate, dimethyl adipate, dimethyl glutarate, and combinations thereof.

8. A method of claim 1 wherein the mixture is shaped into a honeycomb structure.

9. A method of claim 1 wherein the mixture is extruded into a shaped body.

10. A method of claim 9 wherein the mixture is extruded into a honeycomb structure.

11. A method of claim 10 wherein the mixture is composed of in percent by weight about 65% to 95% ZSM-5 zeolite, and about 5% to 35% silicone resin with super additions of about 1% to 10% organic binder selected from the group consisting of methylcellulose, hydroxypropyl methylcellulose, and combinations thereof, and about ½% to 5% polyvinyl alcohol, and water.

* * * * *